(12) United States Patent
Gai et al.

(10) Patent No.: US 8,467,944 B2
(45) Date of Patent: Jun. 18, 2013

(54) SINGLE CONTROL LEVER FOR COMBINED CONTROL OF THE THROTTLE OF ONE OR MORE ENGINES AND OF A REVERSING GEAR MECHANISM

(75) Inventors: Giorgio Gai, Genoa (IT); Marco Campagna, Genoa (IT); Marco Vaccari, Genoa (IT)

(73) Assignee: Ultraflex S.p.A., Casella (GE) (IT)

( * ) Notice: Subject to any disclaimer, the term of this patent is extended or adjusted under 35 U.S.C. 154(b) by 262 days.

(21) Appl. No.: 12/851,397

(22) Filed: Aug. 5, 2010

(65) Prior Publication Data
US 2011/0030492 A1   Feb. 10, 2011

(30) Foreign Application Priority Data
Aug. 6, 2009 (IT) .............................. GE2009A0062

(51) Int. Cl.
F02D 9/00 (2006.01)
G05G 9/00 (2006.01)
G05G 13/00 (2006.01)
F16H 59/02 (2006.01)

(52) U.S. Cl.
USPC .................... 701/54; 701/21; 701/51; 701/24

(58) Field of Classification Search
USPC ........................................ 701/21, 54, 51, 24
See application file for complete search history.

(56) References Cited

U.S. PATENT DOCUMENTS

| 4,119,186 | A | * | 10/1978 | Choudhury et al. | 477/113 |
| 4,222,474 | A | * | 9/1980 | Choudhury et al. | 477/112 |
| 4,425,620 | A | * | 1/1984 | Batcheller et al. | 701/52 |
| 5,161,508 | A | * | 11/1992 | Zentgraf et al. | 123/339.25 |
| 5,222,901 | A | * | 6/1993 | Burkenpas | 440/86 |
| 5,492,493 | A | * | 2/1996 | Ohkita | 440/86 |
| 5,848,369 | A | * | 12/1998 | Kobelt | 701/54 |
| 6,485,340 | B1 | * | 11/2002 | Kolb et al. | 440/84 |
| 6,866,022 | B1 | * | 3/2005 | Phillips et al. | 123/400 |
| 8,128,443 | B2 | * | 3/2012 | Gai et al. | 440/86 |
| 8,165,736 | B2 | * | 4/2012 | Gai et al. | 701/21 |
| 2001/0035063 | A1 | * | 11/2001 | Muller | 74/469 |
| 2005/0014427 | A1 | * | 1/2005 | Yoda et al. | 440/86 |
| 2005/0143875 | A1 | * | 6/2005 | Gai | 701/21 |
| 2005/0148247 | A1 | * | 7/2005 | Gai | 440/84 |
| 2006/0046585 | A1 | * | 3/2006 | Harada et al. | 440/84 |
| 2007/0250222 | A1 | * | 10/2007 | Okuyama et al. | 701/2 |
| 2009/0221196 | A1 | * | 9/2009 | Blair | 440/87 |

OTHER PUBLICATIONS

Italian Ministry of Economic Development, Italian Patent and Trademark Office, Rapporto di Ricerca & Opinione Scritta (Research Report & Written Opinion), Apr. 26, 2010.

* cited by examiner

*Primary Examiner* — Thomas Black
*Assistant Examiner* — Sara Lewandroski
(74) *Attorney, Agent, or Firm* — Themis Law

(57) ABSTRACT

A single lever control for combined control of the throttle of one or more engines, for example of boats, and of a reversing gear mechanism includes a system that alternately couples and uncouples the motion of the lever to the reversing gear driving mechanism and to the members controlling the throttle of the one or more engines as a function of the angular position of the lever.

4 Claims, 6 Drawing Sheets

SINGLE CONTROL LEVER FOR COMBINED CONTROL OF THE THROTTLE OF ONE OR MORE ENGINES AND OF A REVERSING GEAR MECHANISM

FIELD OF THE INVENTION

The present invention relates to a single lever control for the combined control of the throttle of one or more engines, for example for boats, and of a reversing gear mechanism.

Said single lever includes a lever integrally mounted to a support shaft that oscillates about its longitudinal axis; a drive mechanism of a mechanical reversing actuator; and one or more electromechanical transducers.

The angular travel of the oscillating lever identifies two end positions of an oscillation range, i.e. a positive end position and a negative end position, corresponding respectively to the forward gear at maximum rotations per minute (rpm) of the one or more engines and the reverse gear at maximum rpm of the engine/s, and also identifies an intermediate position between said two end positions, corresponding to the neutral state at minimum rpm of the engine/s.

The angular motion of the lever and of said support shaft is converted by kinematic chains either into an angular motion that drives the mechanical reversing actuator, or into an angular motion that drives the control shafts of said one or more electromechanical transducers. Such transducers are in turn electrically connected through output/s to engine throttle control members, such that said control members receive a signal uniquely related to the angular motion, and hence to the angular position, of the lever.

BACKGROUND OF THE INVENTION

Single lever controls for controlling throttle of one or more engines are known and widely used, and incorporate both the reversing gear mechanism and the mechanism for controlling the throttle, and hence the rpm of the one or more engines, in a single device.

The reversing gear mechanism is actuated to enable switching from the reverse gear to the forward gear through the neutral position, and vice versa, as soon as the engine throttle control mechanism sets the engine/s to minimum rpm.

In prior art single lever controls, the angular motion of the lever and hence of the support shaft of the lever throughout the entire angular travel of the lever, which is required for reversing, is converted by cams and gears and is not transmitted to the engine throttle control mechanism, so that said engine throttle control mechanism is uncoupled from the support shaft of the lever and from the lever itself.

For example, the angular motion of the lever and the support shaft of the lever may be converted into a rectilinear motion by a cam.

These configurations have the drawback that the engine throttle control mechanism does not completely uncouple from the lever for the angular reversing travel of said lever.

This situation may cause the buildup of mechanical tolerances in gears, which hinders perfect synchronization of the throttle control mechanism with the reversing gear mechanism. Such synchronization requires the engines to be kept at minimum rpm throughout the angular travel of the lever required for reversing, the engine throttle control mechanism being coupled again to the lever once said travel has been completed.

Thus, the synchronization of the reversing gear mechanism with the engine throttle control mechanism may fail, causing problems for the proper operation of the engines and the reversing gear mechanism. Those problems may lead, in the most serious cases, to damages of various degrees.

SUMMARY OF THE INVENTION

The present invention has the object of obviating the drawbacks of the prior art by providing a single lever control, in which means are provided for alternately coupling and uncoupling the motion of the lever to the reversing gear driving mechanism and to the electromechanical transducers as a function of the angular position of the lever.

During a first angular travel from the intermediate position, which corresponds to the neutral position at minimum rpm of the engine/s, through a first oscillation range smaller than the maximum oscillation range between the two positive and negative end positions, coupling and uncoupling means hold the lever coupled to the reversing gear driving mechanism and uncoupled from the electromechanical transducers whereas, during further displacement toward the positive or negative end positions that are beyond the limit of said first oscillation range, the uncoupling and coupling means switch their state, thereby uncoupling the lever from the reversing gear driving mechanism and coupling it to the electromechanical transducers.

In a preferred embodiment, said coupling and uncoupling means consist in the conformation and the configuration of the kinematic chains that couple the support shaft of the lever to the drive mechanism of a mechanical reversing actuator and to the control shafts of the one or more electromechanical transducers.

The kinematic chain that couples the support shaft of the lever to the drive mechanism of a mechanical reversing actuator has a main reversing gear that is coupled to the support shaft of the lever, which has a toothed part. Such part is engaged with a secondary reversing gear, which also has a toothed part, delimited by two recesses, with the same radius of curvature as the reversing gear, so that the two gears are only mutually engaged along a limited angular motion, beyond which transmission is interrupted and the secondary reversing gear is still, whereas the main reversing gear rotates without meshing in one of the recesses.

The main reversing gear is further equipped with an axial coupling pin, eccentric to the axis of rotation of the gear.

The kinematic chain that couples the support shaft of the lever to the control shafts of the one or more electromechanical transducers has a main transducer control gear, with the support shaft of the lever pivoting thereon in a non integral fashion. The main transducer control gear is coupled to one or more secondary transducer control gears, which are connected to the transducer control shafts. The main transducer control gear has an arched coupling slot of predetermined angular amplitude, and the axial coupling pin on the main reversing gear is inserted therein such that, when the main reversing gear rotates for an amplitude smaller than that of the arched coupling slot, the axial coupling pin may run in the arched coupling slot for its entire angular travel without transmitting motion to the main transducer control gear. Instead, when the angular amplitude of rotation exceeds the angular amplitude of the arched coupling slot, the axial coupling pin drives the main transducer control gear into motion.

In one embodiment, the arched coupling slot has an angular amplitude of 60° and the center position of the axial coupling pin in said arched coupling slot corresponds to the neutral position, in which the engine/s are in the throttle condition that corresponds to the minimum rpm of said engine/s.

For an angular travel of 30° from the center position either in the direction of the positive end position or of the negative end position, the rotation of the lever and its support shaft causes the main reversing gear keyed to said support shaft of the lever to move, thereby driving a mechanical reversing actuator and allowing switching from the neutral position to the forward or reverse gear.

For such entire 30° angular travel, the axial pin integral with the main reversing gear slides within the arched coupling slot without transferring any motion to the main transducer control gear, and allows the electromechanical transducers to remain in a state that corresponds to a minimum rpm engine throttle control condition. Instead, once the angular amplitude of rotation exceeds 30°, the axial coupling pin drives the main transducer control gear, and allows the angular motion of the lever through the electromechanical transducers to control the throttle of the engine/s and hence to cause their acceleration, i.e. to increase rpm.

In case of a reversed angular motion of the lever, i.e. when the latter moves from either end position to the center position, the axial coupling pin is not driven by the main transducer control gear to the center position but is moved thereto elastically, that is, by elastic means.

Such elastic means may be, for instance, springs, and may operate either on the main transducer control gear or on the secondary transducer control gears.

The drive mechanism of a mechanical reversing actuator is composed of a rocker system pivoted on the secondary reversing gear, with control cables coupled to its ends, in order to transmit the angular motion of the rocker to a reversing switch member.

The electromechanical transducers may be of any type, for example may be variable resistance potentiometers. In a preferred embodiment, the electromechanical transducers are Hall position transducers.

The main reversing gear has two radial stop members, each cooperating with a corresponding abutment member.

One embodiment includes two radial pins that project from the outer surface of the main reversing gear, and two fixed stop pins being provided on a plate that is fixedly located on a plane perpendicular to the support shaft of the lever and that is penetrated by said support shaft of the lever. Accordingly, the two fixed stop pins, acting as abutments for the two radial pins that rotate with the main reversing gear, operate as limit stops for the rotation of the main reversing gear and hence of the lever integral therewith.

In an alternative embodiment, the electromechanical transducer/s are replaced by mechanical means for remote control of engine throttle control members, for example, by an accelerator rocker element that is integrally mounted to the main transducer control gear, with a wire fixed at its ends for driving said engine throttle control members.

In this alternative embodiment, no secondary transducer control gears are provided and the rocker element is forced into a position corresponding to the minimum rpm of the engine/s elastically, that is, with elastic means, such as a torsion spring placed on the arm of the accelerator rocker element opposite to the arm with the wire for driving the engine throttle control members fixed thereto.

Moreover, according to the present invention, the single level control may have a unit for processing the output signal of the electromechanical transducers. Such processing unit changes the signals generated by the electromechanical transducers and provides signals at its output for controlling throttle adjusting actuators or for setting the rpm of the engine/s.

This unit for processing the output signal of the electromechanical transducers generates a processed signal that controls engine rpm adjustment, which is a linear or non linear function of the output signal of the electromechanical transducers.

The type of such linear or non linear function and its parameters can be set by analog or digital means, i.e. analogically or digitally.

The signal processing unit processes the output signals of the electromechanical transducers by changing their minimum starting value, corresponding to the angular central neutral position of the lever, and their maximum end value, corresponding to the angular end positions of the lever, whereas the signals corresponding to intermediate positions of the lever are processed according to said predetermined linear or non linear function that starts from the minimum value and ends at the maximum value.

The signal processing unit is composed of electronic means, which include a plurality of sections, each adapted to generate a predetermined function for processing the output signal of the electromechanical transducers.

For instance, a section may be used to set the maximum and minimum values of the processing function.

Also, there may be a further section that includes a matrix of settable values, which allows the function of the output signal of the electromechanical transducers to be changed as desired into a new processing function to be transmitted to the engine rpm adjustment devices.

In particular, the angular rotation signal is divided into predetermined small steps, and the matrix allows each step to be associated with a particular processing function, such as a multiplication with a given predetermined factor.

Additional sections may have values that are preset to generate predetermined processing functions, such as linear, quadratic, or cubic functions.

Setting means operate as selectors for alternate actuation of those sections and set the parameters of those functions.

In a preferred embodiment, the setting means are in the form of a plurality of switches that may be set to be closed or opened by a user.

Those switches are enclosed in one or more dip-switches, eight switches being provided without limitation in one embodiment. The first four of such eight switches are designed to set the starting minimum value of said function, which corresponds to the angular central neutral position of the lever, and the other four are designed to set the maximum end value of said function, which corresponds to the angular end positions of the lever.

In one embodiment, the signal processing unit is located proximate to the lever.

In accordance with a further embodiment, the invention includes means for indicating the minimum and maximum throttle or rpm settings of the engine/s and/or the correlation function between the output signal of the electromechanical transducers and the control signal for the actuators setting the throttle and/or rpm of the engine/s situated at the output of the processing means.

BRIEF DESCRIPTION OF THE DRAWINGS

These and other features and advantages of the invention will be more apparent from the following description of exemplary embodiments depicted in the accompanying drawings. These drawings constitute a part of the present specification.

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in different detailed systems, structures, or manners.

Figure 1:
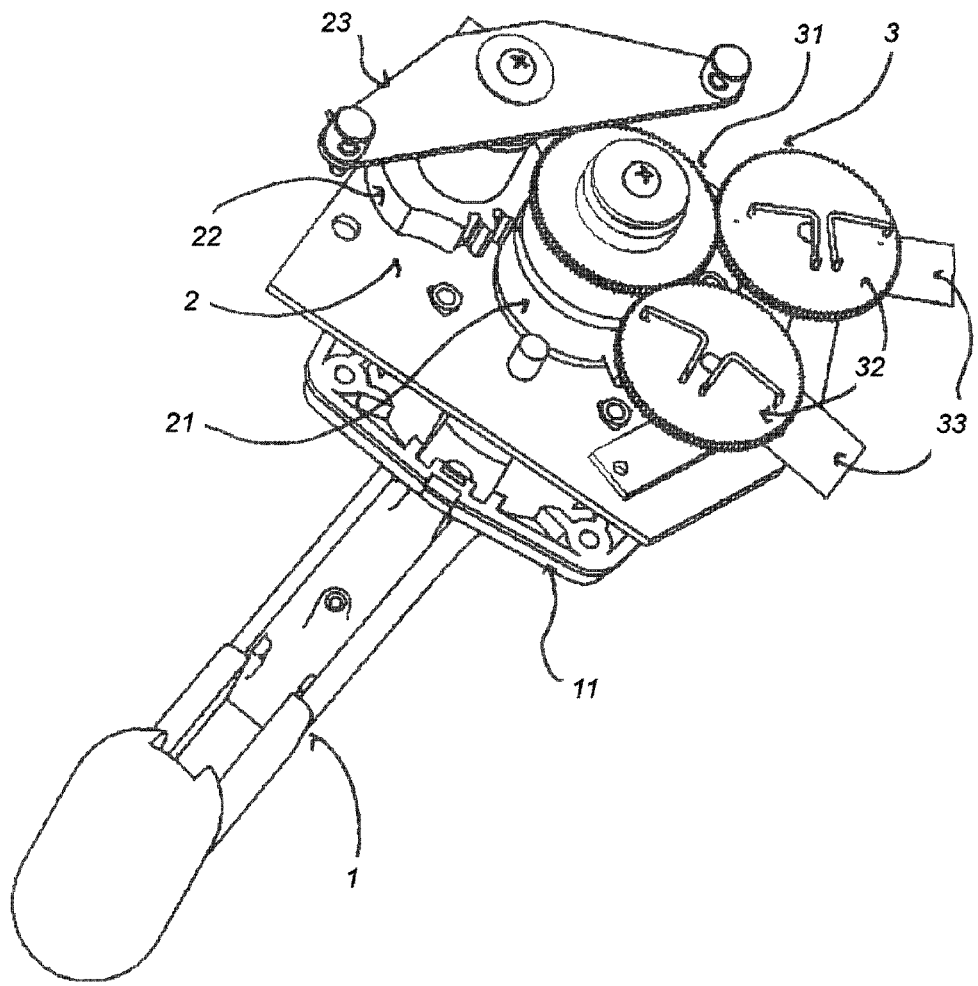
FIG. 1 is a rear view of the lever and of the kinematic chains that couple the shaft of the lever of the electromechanical transducers and to the drive mechanism of a mechanical reversing actuator.

FIG. 1 illustrates a rear view of the lever 1, of the kinematic chain 2 that couples the lever support shaft (not shown) to the drive mechanism of a mechanical reversing actuator 23, and of the kinematic chain 3 that couples the lever support shaft to the electromechanical transducers 33.

The lever 1 is pivotally fixed to a plate 11, allowing fastening of the plate 11 to a wall (not shown), i.e. of a boat. The lever shaft passes through said plate and engages with the back of said wall, by the kinematic chains 2 and 3.

The kinematic chain 2 that couples the pivotal support shaft of the lever to the drive mechanism of a mechanical reversing actuator 23 consists of the main reversing gear 21 keyed to the lever shaft, and the secondary reversing gear 22, which secondary reversing gear 22 is integrally engaged with said drive mechanism of a mechanical reversing actuator 23.

Figure 2:
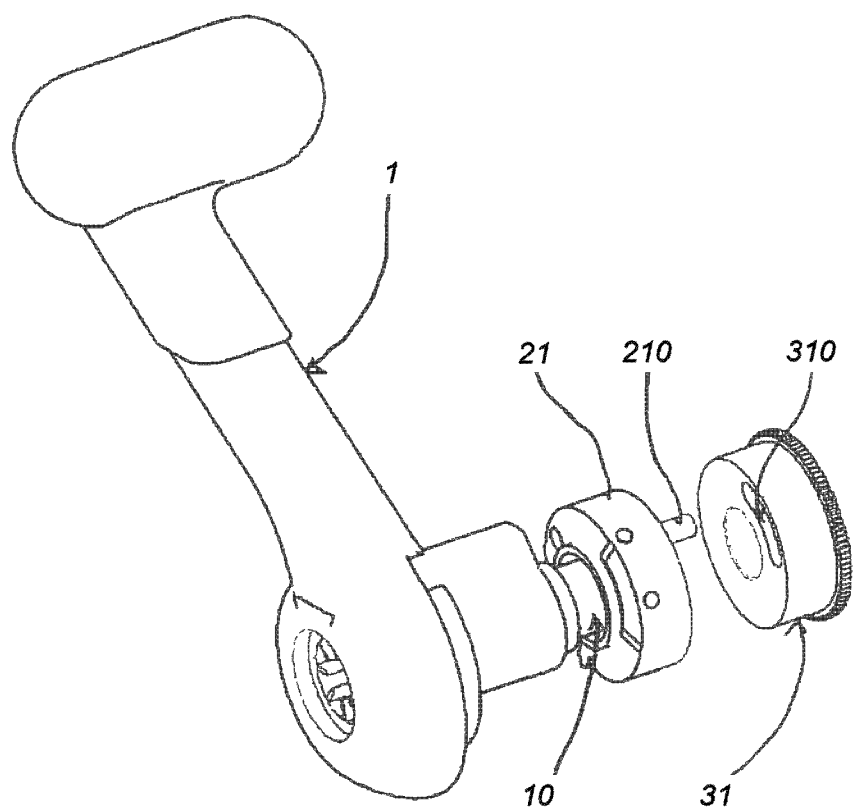
FIG. 2 is a detailed view of the coupling mechanism between the main reversing gear and the main transducer control gear, based on using the axial coupling pin and the corresponding arched coupling slot.

FIG. 2 is a detailed view of the coupling mechanism between the main reversing gear 21 and the main transducer control gear 31, using the axial eccentric coupling pin 210 and the corresponding arched coupling slot 310.

Figure 3:
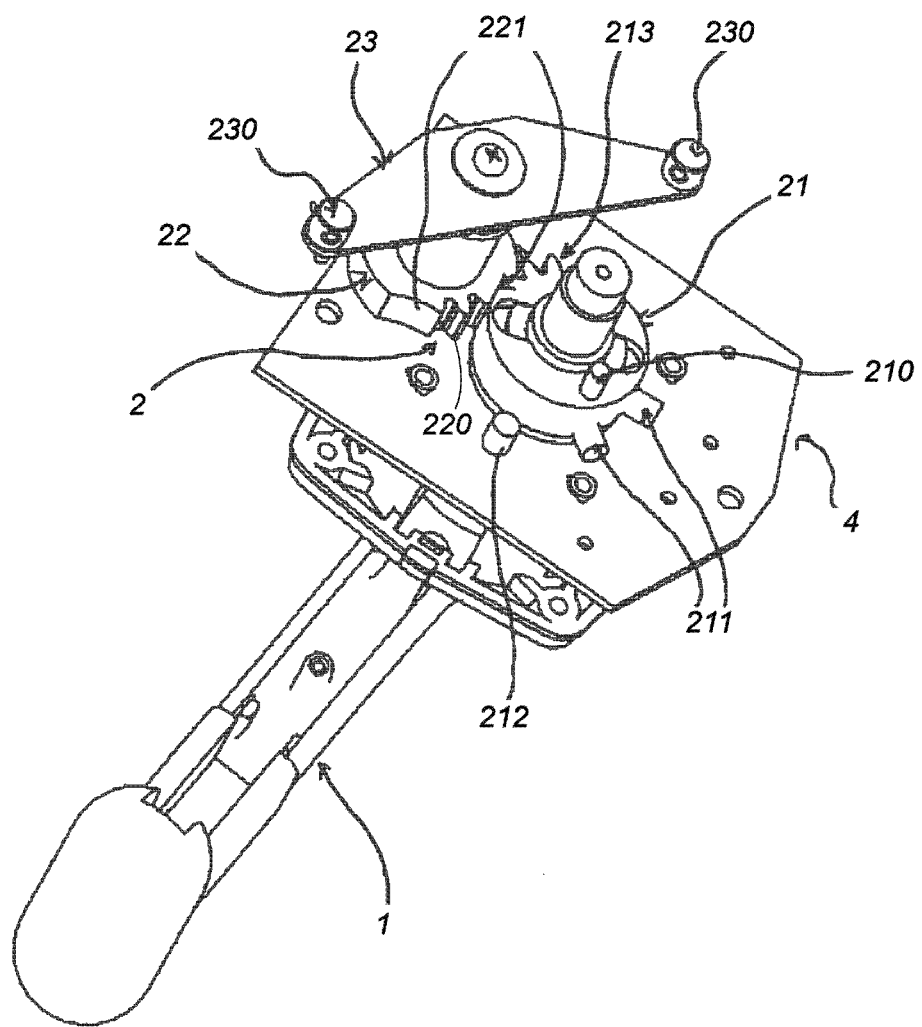
FIG. 3 shows the kinematic chain that couples the support shaft of the lever to the drive mechanism of a mechanical reversing actuator.

The main transducer control gear 31 is non integrally pivoted on the lever support shaft 10, by an extension of said shaft, not shown in FIG. 2 but visible in FIG. 3. Said main transducer control gear 31 has said arched coupling 310 of predetermined angular extension, which has the shape of a circular sector and which is coaxial with the axis of the main transducer control gear 31. Said axial eccentric coupling pin 210 on the main reversing gear 21 is inserted in this slot 310, so that, when the main reversing gear 21 rotates through an amplitude smaller than that of the arched coupling slot 310, the axial coupling pin 210 may run throughout the angular travel of said arched coupling slot 310 without transmitting motion to the main transducer control gear 31, and when the angular amplitude of rotation exceeds the angular amplitude of the arched coupling slot 310, the axial coupling pin 210 abuts against the corresponding end of said slot 310 and drives the main transducer control gear 31 into motion.

FIG. 3 shows the kinematic chain 2 that couples the lever support shaft 10 to the drive mechanism of a mechanical reversing actuator 23. In turn, the mechanical reversing actuator 23 has the main reversing gear 21 keyed to the lever support shaft 10 that has a toothed part 213, said toothed part 213 being engaged with a secondary reversing gear 22 that also has a toothed part 220. Said toothed part 220 is delimited by two recesses 221, with the same radius of curvature as said main reversing gear 21, so that the two gears are only mutually engaged along a limited angular motion, beyond which transmission is interrupted and the secondary reversing gear 22 is still, whereas the main reversing gear 21 rotates without meshing with said secondary gear 22 in one of the recesses 221.

Said main reversing gear 21 is further equipped with said axial coupling pin 210, which is located eccentric to the axis of rotation of the gear 21.

Said main reversing gear also has two radial pins 211 which project out of the outer surface of said main reversing gear 21. Two fixed stop pins 212 are provided on a plate 4 fixedly located on a plane perpendicular to the lever support shaft 10 and penetrated by said lever support shaft 10, so that said two fixed stop pins 212, acting as abutments for the two radial pins 211 that rotate with the main reversing gear 21, are limit stops for the rotation of the main reversing gear 21 and hence of the lever 1 integral therewith.

Figure 4:
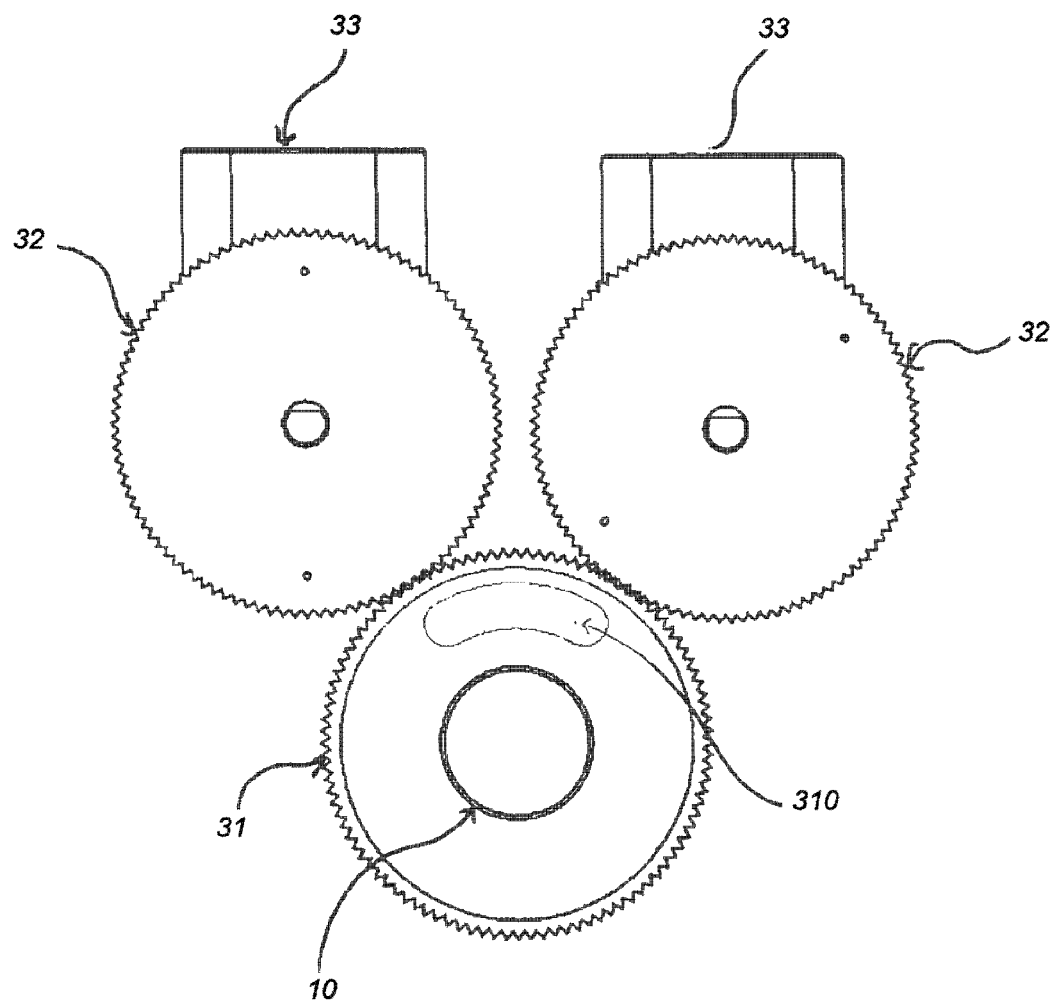
FIG. 4 shows the kinematic chain that couples the support shaft of the lever to the electromechanical transducers.

FIG. 4 shows the kinematic chain 3 that couples the lever support shaft 10 to the electromechanical transducers 33 and has the main transducer control gear 31 in which the lever support shaft 10 is non integrally pivoted. Said main transducer control gear 31 is coupled to the secondary transducer control gears 32 connected to the transducer control shafts, not shown, that drive said electromechanical transducers 33.

The main transducer control gear 31 has said arched coupling slot 310 of predetermined angular extension, with said axial eccentric coupling pin of the main reversing gear inserted therein.

Figure 5:
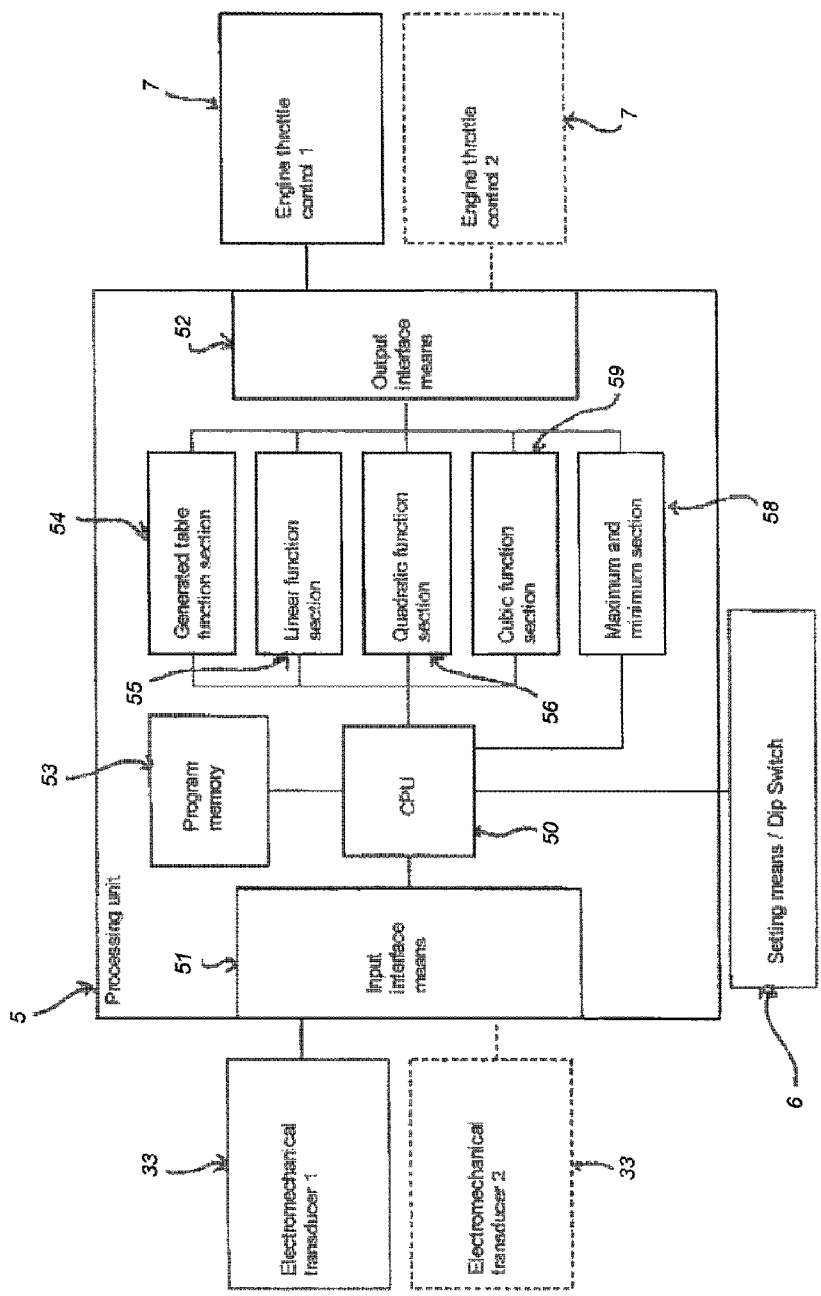
FIG. 5 shows a block diagram of the components and the operation of the processing unit.

FIG. 5 is a block diagram of the components and operation of the processing unit 5, which processing unit 5 receives input signals from the electromechanical transducers 33 through input interface means 51, processes said signals and transmits them to engine throttle control members 7, through output interface means 52.

The processing unit 5 comprises a central processing unit or CPU 50, which is connected to a memory unit 53 and to setting means or dip switch 6 for external adjustment of signal processing type and parameters.

Said CPU 50 sets the function to be generated at the output of said processing unit 5 through the actuation of a maximum and minimum adjustment section 58 for the output function and through alternate actuation of a generated table function section, a linear function section, a quadratic function section or a cubic function section.

Finally, all the sections are connected to output interface means for transmitting the processed signal to the engine throttle control members 7.

Figure 6:
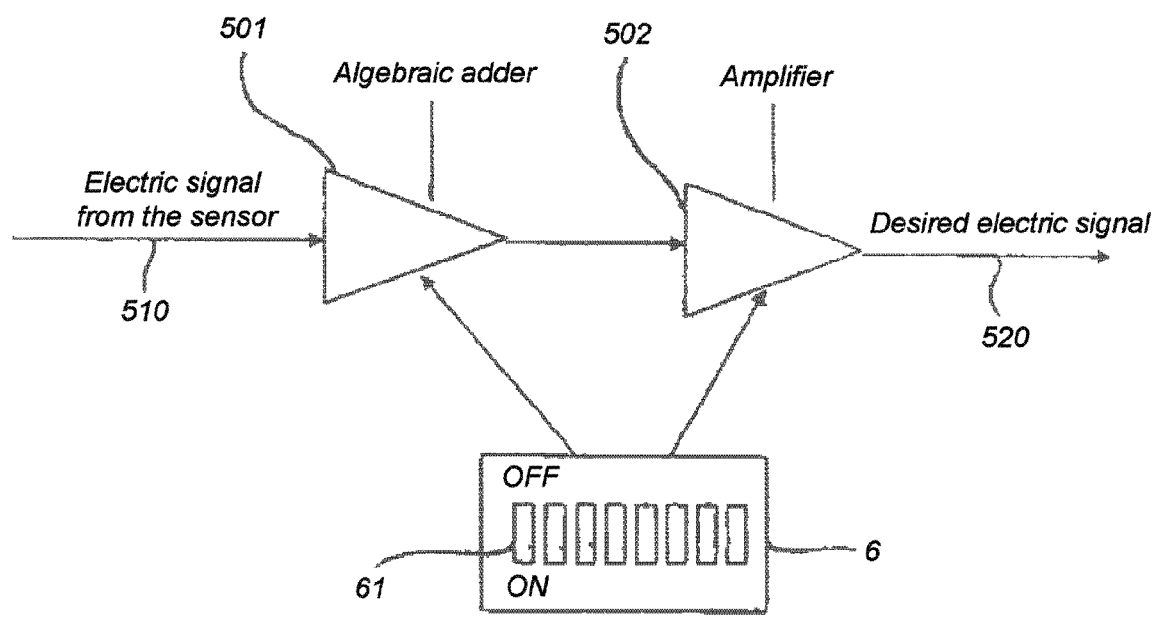
FIG. 6 is a diagram of the operation of the processing unit and the setting means.

FIG. 6 is a diagram of a possible operation of the processing unit and the setting means or dip switch 6, which dip switch 6 is composed of eight switches 61 that may be set to an ON or OFF state.

The first four of these eight switches 61 are designed to set the starting minimum value of said function, corresponding to the angular central neutral position of the lever, the other four being designed to set the maximum end value of said function, corresponding to the angular end positions of the lever.

According to the diagram of the figure, the signal 510 emitted from the electronic transducer first passes through an algebraic adder 501 and then through an amplifier 502, whose transfer functions are set by the particular configuration of the switches 61 of the dip switch 6.

A processed output signal 520 is thus obtained, which is transmitted to the engine throttle control members.

The invention is not limited to the example of the above single lever, but may be also extended to controls having two or three levers, known as two-lever and three-lever controls.

In two-lever controls, one of the two levers controls the inverter, which is of mechanical type, and the other lever is an engine throttle control lever. Also in this case, the motion of the lever is read by a sensor, which is an electromechanical transducer of the same type as the sensors described herein for the single lever control, and is designated by numeral 33 in the figures. In this case, the electromechanical transducer is keyed by its rotatable element to the shaft of the engine throttle control lever.

In the same manner as described for the two-lever control, the invention may be extended to the three-lever control. In this type of control, one lever controls the mechanical inverter and the two remaining levers control the engine throttle. Each of these two engine throttle control levers is thus associated with a sensor as described for the single lever and two-lever control. Each sensor has a rotatable element that is keyed to the shaft of one of said two engine throttle control levers.

As described and shown with reference to the single lever embodiment, the two-lever and three-lever control also allow minimum and maximum adjustment using one or more control cards.

The inventive arrangements, i.e. the circuit diagram and the features as provided and described with reference to the single lever are thus intended to be extended to throttle control levers of two-lever and three-lever controls, with the appropriate construction and circuit changes as required to adapt the single lever embodiment to two-lever and three-lever controls respectively.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

What is claimed is:

1. A single lever control for combined throttle control of one or more engines and of a reversing gear mechanism comprising:
   a processing unit processing an output signal of one or more electromechanical transducers,
   wherein the processing unit is configured to receive signals generated by the one or more electromechanical transducers and to provide signals at an output that control throttle adjusting actuators or set rpm of the one or more engines,
   wherein the processing unit generates a control signal adjusting the rpm of the one or more engines that is a linear or non linear function of the output signal of the one or more electromechanical transducers, type of function and parameters of the function being adapted to be set by analog or digital setting means,
   wherein the processing unit comprises electronic means having a plurality of sections, each of the electronic means being adapted to generate a predetermined function such to process the output signal of the one or more transducers, the setting means being provided to operate as selectors for alternate actuation of the sections and setting parameters of the functions, the setting means being further provided as a plurality of switches that are arranged to be closed or opened by a user, and
   wherein the switches are enclosed in a dip-switch, eight switches being provided therein, the first four of the switches being designed to set starting minimum value that corresponds to an angular central neutral position of the lever, the second four of the switches being designed to set a maximum end value that corresponds to angular end positions of the lever.

2. The single lever control as claimed in claim 1, wherein the unit processes the output signal of the one or more electromechanical transducers by changing a minimum value of the one or more electromechanical transducers that corresponds to an angular central neutral position of the lever, and a maximum end value that corresponds to one of angular end positions of the lever, and wherein signals corresponding to intermediate positions of the lever are processed according to a predetermined linear or non linear function that starts from the minimum value and ends at the maximum value.

3. The single lever control as claimed in claim 1, wherein the processing unit is placed in proximity of the lever.

4. The single lever control as claimed in claim 1, further comprising means for indicating one or more of minimum and maximum throttle or rpm settings of the one or more engines, or a correlation function between the output signal of the electromechanical transducers and a control signal for the actuators that set one or more of the throttle or rpm of the one or more engines at the output of the processing unit.

* * * * *